United States Patent
Heaven, Jr.

(10) Patent No.: US 7,490,794 B2
(45) Date of Patent: Feb. 17, 2009

(54) AIRSHIP HAVING A CENTRAL FAIRING TO ACT AS A STALL STRIP AND TO REDUCE LIFT

(75) Inventor: George H. Heaven, Jr., North Las Vegas, NV (US)

(73) Assignee: LTAS Holdings, LLC, Las Vegas, NV (US)

( * ) Notice: Subject to any disclaimer, the term of this patent is extended or adjusted under 35 U.S.C. 154(b) by 244 days.

(21) Appl. No.: 11/234,443

(22) Filed: Sep. 21, 2005

(65) Prior Publication Data

US 2007/0069076 A1    Mar. 29, 2007

(51) Int. Cl.
    *B64B 1/02*    (2006.01)
(52) U.S. Cl. .................... 244/125; 244/30; 244/96
(58) Field of Classification Search ............ 244/96, 244/125, 126, 30, 25, 24
    See application file for complete search history.

(56) References Cited

U.S. PATENT DOCUMENTS

| | | | |
|---|---|---|---|
| 1,833,033 A * | 11/1931 | Ortega | 244/25 |
| 1,844,765 A * | 2/1932 | Jackson | 244/5 |
| 3,963,198 A | 6/1976 | Vaughan | |
| 3,971,533 A | 7/1976 | Slater | |
| 3,972,492 A | 8/1976 | Milne | |
| 3,972,493 A | 8/1976 | Milne | |
| 4,009,850 A | 3/1977 | Hickey | |
| 4,032,085 A | 6/1977 | Papst | |
| 4,047,729 A | 9/1977 | Smith | |
| 4,085,912 A | 4/1978 | Slater | |
| 4,089,492 A | 5/1978 | Lang | |
| RE30,129 E | 10/1979 | Crompton | |
| 4,269,375 A | 5/1981 | Hickey | |
| 4,272,042 A | 6/1981 | Slater | |
| 4,326,681 A | 4/1982 | Eshoo | |
| 4,591,112 A | 5/1986 | Piasecki et al. | |
| 4,606,515 A | 8/1986 | Hickey | |
| 4,702,441 A | 10/1987 | Wang | |
| 4,967,983 A | 11/1990 | Motts | |
| 5,005,783 A | 4/1991 | Taylor | |
| 5,071,090 A | 12/1991 | Takahashi et al. | |
| 5,110,070 A | 5/1992 | Hagenlocher et al. | |
| 5,240,206 A | 8/1993 | Omiya | |
| 5,285,986 A | 2/1994 | Hagenlocher | |
| 5,294,076 A | 3/1994 | Colting | |
| 5,348,251 A | 9/1994 | Ferguson | |
| 5,348,254 A | 9/1994 | Nakada | |
| 5,358,200 A | 10/1994 | Onda | |
| 5,383,627 A | 1/1995 | Bundo | |

(Continued)

OTHER PUBLICATIONS

"Lighter-Than-Air High Altitude Platform Feasibility Study," Luffman, C.R., (May 9, 2004).
"AeroRaft™—A Brief Insight," Luffman, C.R., (Mar. 21, 2005).

*Primary Examiner*—Timothy D Collins
(74) *Attorney, Agent, or Firm*—Snell & Wilmer L.L.P.

(57) ABSTRACT

An airship including a hull having a lenticular shape and a fairing attached to the hull to act as a stall strip and reduce the lift generated by the hull. The hull is symmetrical along a central horizontal plane and the fairing may be positioned along the central horizontal plane. The fairing may have a triangular shape, a semi-circular shape or any other shape capable of disrupting the flow of air over the hull.

20 Claims, 2 Drawing Sheets

U.S. PATENT DOCUMENTS

| | | |
|---|---|---|
| 5,755,402 A * | 5/1998 | Henry .................. 244/29 |
| 5,909,857 A | 6/1999 | Filimonov |
| 6,010,093 A | 1/2000 | Paulson |
| 6,019,311 A | 2/2000 | Thyen |
| 6,305,641 B1 | 10/2001 | Onda |
| 6,311,925 B1 | 11/2001 | Rist |
| 6,354,535 B1 | 3/2002 | Perry et al. |
| 6,386,480 B1 | 5/2002 | Perry et al. |
| 6,427,943 B2 | 8/2002 | Yokomaku et al. |
| 6,527,223 B1 | 3/2003 | Mondale |
| 6,581,873 B2 | 6/2003 | McDermott |
| 6,607,163 B2 | 8/2003 | Perry et al. |
| 6,648,272 B1 * | 11/2003 | Kothmann .................. 244/97 |
| 6,698,686 B2 | 3/2004 | Ogawa et al. |
| 6,708,922 B1 | 3/2004 | Hamilton |
| 6,805,319 B2 * | 10/2004 | Senepart .................. 244/96 |

* cited by examiner

AIRSHIP HAVING A CENTRAL FAIRING TO ACT AS A STALL STRIP AND TO REDUCE LIFT

FIELD OF THE INVENTION

The invention relates generally to the field of airships. More particularly, the invention relates to an airship having a central fairing to act as a stall strip and to reduce lift.

DESCRIPTION OF THE RELATED ART

A stall is usually an undesirable condition in aerodynamics and aviation where there is a sudden loss of lift. Stalls and resulting spins have caused airplane accidents since the beginning of flight. Even though airplanes have evolved to have better stall characteristics, stalls and spins continue to be a leading cause of airplane accidents.

A stall occurs when airflow separates from all or part of the upper surface of a wing, resulting in a sudden loss of lift. This is caused by the airplane exceeding a critical angle of attack which is the angle between the relative wind and the chord line of the airfoil. Below the critical angle, airflow over the wing surface is relatively smooth. Above the critical angle, the thin layer of air above the wing or "boundary layer" becomes turbulent and separates from the airfoil. The lift is destroyed and the drag increases, causing the airplane to lose altitude. Pilots are trained to recover from this condition by decreasing the angle of attack and increasing the airspeed until smooth air flow over the wing is resumed. However, if the stall occurs too low to the ground, there may not be enough altitude to recover.

Airplanes have been equipped with a variety of devices to prevent or postpone a stall. For example, a stall strip is a small sharp-edged device which, when attached to the leading edge of a wing, encourages the stall to start there in preference to any other location on the wing. That is, the stall strip disrupts the boundary layer causing the affected portion of the wing to stall several degrees before the rest of the wing. The portion of the wing stalling warns the pilot that a stall is imminent. A stall strip is generally attached to one or more wings of an airplane.

Airplanes rely exclusively on dynamic lift (i.e., lift generated by the flow of air over a wing). Airships, on the other hand, generate most of their lift from static lift (i.e., lift generated by the positive buoyancy of the lifting gas contained within the airship's hull), supplemented by a relatively small amount of dynamic lift. The relatively small amount of dynamic lift employed by airships can come from the flow of air over (i) external control surfaces such as an empennage and/or (ii) the surface of the airship hull itself. Some hull shapes, such as a lenticular shape, act as a more efficient lifting body and produce relatively more dynamic lift than other hull shapes, such as a traditional "cigar" shape.

The dynamic lift generated by the flow of air over a lenticular hull creates instability that becomes more pronounced at higher airspeeds. Unless this instability is countered by external control surfaces or other control mechanisms, the lenticular airship will experience a loss of control.

SUMMARY OF THE INVENTION

One embodiment of the invention provides a fairing installed on the leading edge of a lenticular airship, or any other airship with a hull shape that may generate dynamic lift, to help reduce lift and stabilize the airship. For example, a stall strip along a perimeter of a lenticular airship reduces the amount of lift generated by the hull.

One embodiment of the invention provides an airship including a hull having a lenticular shape and a fairing attached to the hull to reduce the lift generated by the hull. The hull is symmetrical along a central horizontal plane and the fairing may be positioned along the central horizontal plane. The fairing may have a triangular shape or a semi-circular shape or any other shape capable of disrupting the flow of air over the hull.

One embodiment of the invention provides an airship including a hull being substantially symmetrical along a central horizontal plane and a stall strip protruding from the hull to reduce the lift generated by the hull. The hull may be configured in any shape that may generate lift. The fairing may have a triangular shape or a semi-circular shape or any other shape capable of disrupting the flow of air over the hull.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. For example, the term "hull" as described herein may include, but is not necessarily limited to, a rigid, semi-rigid or non-rigid hull, envelope or other enclosure capable of holding a fluid, a gas and/or other substance and capable of withstanding a specific internal pressure and/or external pressure. The hull may be constructed from a wide variety of materials including, but not necessarily limited to, light metals, composites and/or fabrics formed in a variety of sizes and shapes. For another example, the term "fairing" as described herein may include, but is not necessarily limited to, a stall strip, protrusion or similar device or structure that may disrupt the flow of air over a surface.

Figure 4:
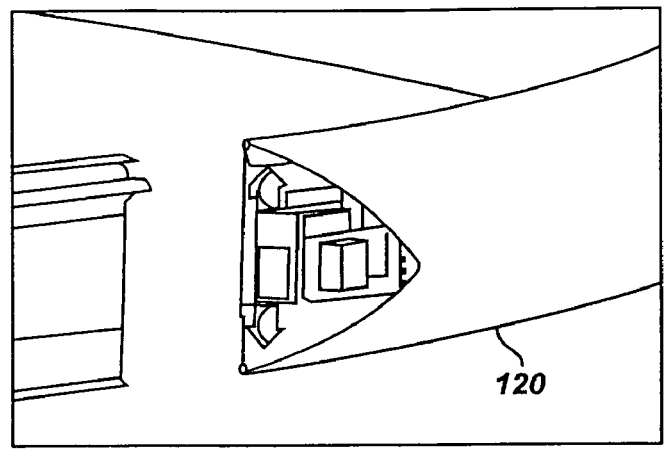
FIG. 4 illustrates a perspective view of the fairing according to one embodiment of the invention.
Figure 1:
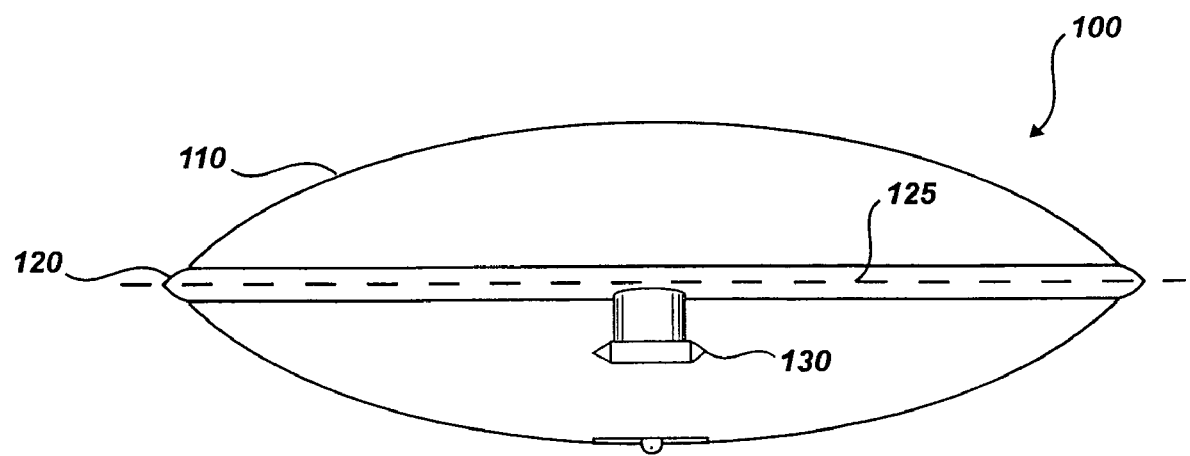
FIG. 1 illustrates a front view of an airship having a hull according to one embodiment of the invention.

FIG. 1 illustrates a front view of an airship 100 having a hull 110 that may be made of a flexible (e.g., fabric) and/or rigid (e.g., lightweight metal or composite) material, or a combination thereof, to provide structural integrity to the airship 100, alone or in conjunction with an internal structural framework. The hull 110 may be configured in the shape of a sphere, a flattened sphere or ellipse (i.e., lenticular or "saucer"

shape), a toroid, a cigar (i.e., resembling a traditional blimp) and various other aerodynamic shapes that may generate lift.

The hull 10 may be designed to contain one or more lifting gases (e.g., helium, hydrogen, heated air, oxygen, other gases and/or combinations thereof) or to enclose one or more chambers (e.g., balloons or cells) that may contain the one or more lifting gases. The lifting gases may provide all or most of the lift so that little or no additional energy is expended for the airship 100 to become airborne. In one embodiment, the hull 110 and/or the one or more chambers may be under an internal pressure greater than atmospheric pressure.

The airship 100 may also be a lifting body without wings that derives lift from the shape of its hull 110. For example, the hull 110 may generate significant lift and drag in flight due to its lenticular or toroidal shape.

The airship 100 may also include a fairing 120 positioned on the hull 110. In one embodiment, the fairing 120 may be located along a central perimeter 125 of the hull 110. The fairing 120 may be located around the entire central perimeter 125 or a portion of the central perimeter 125 of the hull 110. In one embodiment, the fairing 120 is located along a leading edge of the hull 110. The fairing 120 can be made of an aluminum, fiberglass, metallic, plastic or composite material.

Figure 3:
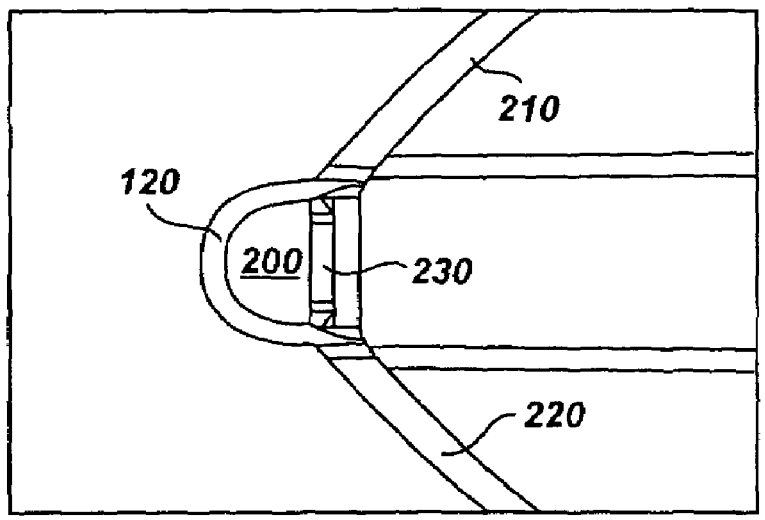
FIG. 3 illustrates a cross-sectional view of the hull and the fairing formed in the shape of a semi-circle according to one embodiment of the invention.
Figure 2:
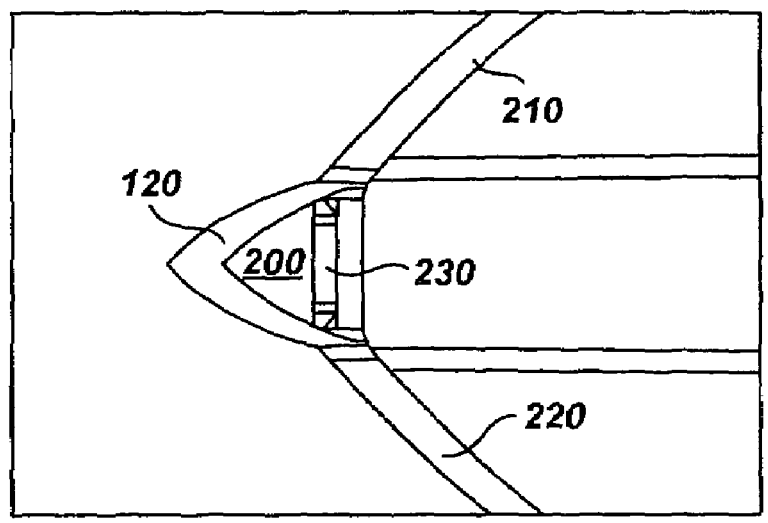
FIG. 2 illustrates a cross-sectional view of the hull and the fairing formed in the shape of a triangle according to one embodiment of the invention.

FIG. 2 illustrates a cross-sectional view of the hull 110 and the fairing 120. The fairing 120 can be formed in the shape of a triangle (FIG. 2), a semi-circle (FIG. 3) or any other shape capable of disrupting the air flow over the hull 110. Within the fairing 120, a pathway 200 may exist to allow one or more mass transfer devices to travel therein. The pathway 200 may include, but is not necessarily limited to, a track, a guide, a passageway, a path, a rail, a tube, and/or a tunnel on or through which a device (e.g., a mass transfer device) may be guided or may ride. Further details regarding the pathway and the mass transfer devices can be found in co-pending patent application entitled Mass Transfer System for Stabilizing an Airship and Other Vehicles Subject to Pitch and Roll Moments, Ser. No. 10/872,743, filed Jun. 21, 2004, herein incorporated by reference in its entirety.

The airship 100 may have an upper hull member 210 that fits on top of and connects to a lower hull member 220. The upper and lower hull members 210 and 220 are substantially symmetrical along a central horizontal plane 125 (see also FIG. 1). In one embodiment, the airship 100 may have a one-piece hull formed in the shape of a toroid.

The fairing 120 may be attached to, supported by, or integrated with a structural ring 230 or other structural component. The structural ring 230 may support and connect the upper and lower hull members 210 and 220. The structural ring 230 may be made of a metallic or composite material. The structural ring 230 may be positioned at the base of the fairing 120 and may travel around the entire circumference of the airship 100 to function as a load-bearing support member.

In one embodiment, the fairing 120 and/or the structural ring 230 can be attached to an outer surface of the hull using Velcro, lacing, adhesives or other fastening devices. The hull may be a single structure, member or tube that allows the fairing 120 and/or the structural ring 230 to be attached to its outer curved surface.

The fairing 120 may be a curved structure (e.g., semi-circular) or a pointed structure (e.g., triangular) protruding from the hull 110 or any other structure that disrupts the flow of air over the hull 110 and reduces the lift generated by the hull 110. Typically, at large angles of attack, the fairing 120 will disrupt the boundary layer over the hull 110 to create turbulence and reduce the dynamic lift of the airship 100. The fairing 120 reduces the amount of dynamic lift but also reduces the amount of undesirable porpoising (i.e., up and down movements of the front of the airship 100) and instability experienced by the airship 100 in flight. The fairing 120 increases the stability of the airship 100.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. An airship comprising:
a single hull having a lenticular shape; and
a fairing attached in direct contact with the hull for reducing the lift generated by the hull, the fairing being a separate structure distinct from the hull.

2. The airship of claim 1 wherein the hull is symmetrical along a central horizontal plane.

3. The airship of claim 2 wherein the fairing is positioned along the central horizontal plane.

4. The airship of claim 1 wherein the fairing has a triangular shape.

5. The airship of claim 1 wherein the fairing has a semi-circular shape.

6. The airship of claim 1 wherein the fairing extends along a perimeter of the hull.

7. The airship of claim 6 further comprising a structural ring positioned along a base of the fairing.

8. The airship of claim 1 further comprising a pathway positioned within the fairing to carry one or more mass transfer devices.

9. The airship of claim 8 wherein the pathway is selected from a group consisting of a track, a guide, a passageway, a path, a rail, a tube, a tunnel, and combinations thereof.

10. The airship of claim 1 wherein the fairing is made of an aluminum, fiberglass, metallic, plastic or composite material.

11. An airship comprising:
a single hull having a lenticular shape and being substantially symmetrical along a central horizontal plane; and
a stall strip attached in direct contact with the hull for reducing the lift generated by the hull, the stall strip being a separate structure distinct from the hull.

12. The airship of claim 11 wherein the hull does not have wings attached thereto.

13. The airship of claim 11 wherein the stall strip is positioned along the central horizontal plane.

14. The airship of claim 11 wherein the stall strip has a triangular shape.

15. The airship of claim 11 wherein the stall strip has a semi-circular shape.

16. The airship of claim 11 wherein the stall strip extends along a perimeter of the hull.

17. The airship of claim 11 further comprising a structural ring positioned along a base of the stall strip.

18. The airship of claim 11 further comprising a pathway positioned within the stall strip to carry one or more mass transfer devices.

19. The airship of claim 18 wherein the pathway is selected from a group consisting of a track, a guide, a passageway, a path, a rail, a tube, a tunnel, and combinations thereof.

20. The airship of claim 11 wherein the stall strip is made of an aluminum, fiberglass, metallic or plastic material.

* * * * *